United States Patent [19]

Tabei

[11] Patent Number: 5,063,439
[45] Date of Patent: Nov. 5, 1991

[54] SOLID STATE PICKUP SYSTEM HAVING IMPROVED COLOR REPRODUCIBILITY

[75] Inventor: Masatoshi Tabei, Kanagawa, Japan

[73] Assignee: Fuji Photo Film Co., Ltd., Kanagawa, Japan

[21] Appl. No.: 534,563

[22] Filed: Jun. 7, 1990

[30] Foreign Application Priority Data

Jun. 8, 1989 [JP] Japan .................................. 1-143971
Jul. 24, 1989 [JP] Japan .................................. 1-188844
Aug. 16, 1989 [JP] Japan .................................. 1-210195

[51] Int. Cl.$^5$ ............................................. H04N 9/07
[52] U.S. Cl. ......................................... 358/41; 358/44
[58] Field of Search ....................... 358/41, 43, 44, 80, 358/75

[56] References Cited

U.S. PATENT DOCUMENTS 4,930,008  5/1990  Suzuki et al. .......................... 358/78
4,965,663 10/1990  Sasaki .................................... 358/80

FOREIGN PATENT DOCUMENTS 61-93787  5/1986  Japan .

Primary Examiner—James J. Groody
Assistant Examiner—Kim Yen Vu
Attorney, Agent, or Firm—Sughrue, Mion, Zinn, Macpeak & Seas

[57] ABSTRACT

A solid state pickup system having improved color reproducibility characteristics involves using additional photodetector elements to produce color signals including wavelength components in areas of negative stimulus values. These color signals are subtracted from conventionally produced color signals, such conventionally produced color signals being incapable of representing the negative stimulus values. The algebraic difference between the color signals resulting from the subtraction operation results in a color signal adequately represented in a wider range of wavelength characteristics, including the negative stimulus values, thus greatly improving color reproducibility.

11 Claims, 13 Drawing Sheets

FIG. 15

| G₁ | G₁ | G₁ | G₁ | G₁ | G₁ |
|----|----|----|----|----|----|
| R  | B  | G₂ | R  | B  | G₂ |
| G₁ | G₁ | G₁ | G₁ | G₁ | G₁ |
| R  | B  | G₂ | R  | B  | G₂ |

FIG. 16

| R | G₀ | B | G₁ | R | G₀ |
|---|----|---|----|---|----|
| R | G₁ | B | G₀ | R | G₁ |
| R | G₀ | B | G₁ | R | G₀ |
| R | G₁ | B | G₀ | R | G₁ |

SOLID STATE PICKUP SYSTEM HAVING IMPROVED COLOR REPRODUCIBILITY

BACKGROUND OF THE INVENTION

The present invention relates to a solid state pickup system for picking up an image by use of a color solid state pickup device, and particularly relates to a solid state pickup system giving an effect of a negative spectral sensitivity so as to produce a picture signal having improved color reproducibility.

Concerning conventional solid state pickup systems, a camera having a built-in video tape recorder (VTR) in which CCD image sensors are used for a solid state pickup device, an electronic still camera, a copy machine, and other picture equipments are known.

In such a system, for example, of a single plate type, an image is picked up and converted photoelectrically by a solid state pickup device having a photodetection surface on which an optical filter constituted by very small filters having spectral characteristics of red (R), blue (B) and green (G) or their complementary colors are arranged in a mosaic form, so that electric signals (hereinafter referred to as 'color signals') corresponding to stimulus values of the above-mentioned respective colors are generated. In a system of a multi-plate type, on the other hand, an image is picked up and converted photoelectrically by specific solid state pickup devices having spectral characteristics of red (R), blue (B) and green (G) or their complementary colors. That is, solid state pickup devices, the number of which corresponds to the number of respective colors, produce color signals.

Then, for example, dot phosphors are made to emit light by electronic beams corresponding to the respective stimulus values of color signals R, G and B, so that color reproduction of a subject to be picked up is achieved by color mixture.

As has been well known, reproduction of intermediate colors by color mixture is realized on the basis of the threeway ratio of light intensity among three primary colors (R), (G) and (B) as plotted in the chromaticity diagram shown in FIG. 8, or their complementary colors cyan (C), magenta (M) and yellow (Y). The principle is such that, in the case of R, G and B, it is possible to reproduce a desired intermediate color inside the area (hereinafter referred to as 'ideal reproducible area by three primary colors') of the triangle (the solid line triangle in FIG. 8) taking these primary colors as its apexes, and on the other hand, in the case of C, M and Y, it is possible to reproduce a desired intermediate color inside the area (hereinafter referred to as 'ideal reproducible area by complementary colors') of the triangle illustrated by the one-dotted chain line in FIG. 8. A chromaticity diagram without the complementary colors shown is illustrated in FIG. 10 for the sake of simplicity.

However, when color reproduction is performed by use of color signals obtained by a conventional solid state pickup device photoelectrically converting light from a subject, a real reproducible area is narrower than the above-mentioned ideal reproducible area. For example, the real reproducible area corresponds to the inner area of the triangle having apexes r, g and b illustrated by the dotted triangle in FIGS. 8 and 10.

Here, according to the additive mixture of colors, the following interrelation is established between the three primary colors and their respective complementary colors:

$$Y = R + G$$
$$C = G + B$$
$$M = B + R$$
$$W = R + G + B$$

Now further describing the real reproducible area on the basis of the three primary colors (R), (G) and (B), when the above-mentioned dot phosphors of (R), (G) and (B) of a color picture tube are made to emit light by use of electric signals of red (r), green (g) and blue (b) obtained by photoelectric conversion of a conventional solid state pickup device so that color reproduction is performed, or when luminous elements of the three primary colors are made to emit light by use of the above-mentioned electric signals so that color reproduction is performed, a real reproducible area becomes narrower than the ideal reproducible area in FIGS. 8 and 10.

That is, in the prior art, it is impossible to obtain color signals R, G and B corresponding to the three primary colors (R), (G) and (B) positioned at the apexes of the triangle of the ideal reproducible area, and it is possible only to obtain colors (r), (g) and (b) shifted inside the triangle in comparison with their theoretical values, as three primary colors.

It is, therefore, impossible in the prior art to reproduce an intermediate color A in the area inside the ideal reproducible area and outside the real reproducible area in FIGS. 8 and 10, so that an intermediate color A' reproduced by the colors (r), (g) and (b) is regarded as the above-mentioned intermediate color A. As a result, for the intermediate color A of a subject to be recorded, what is in fact reproduced, is, the diluted intermediate color A, nearer white W than the color The reason why ideal color reproduction cannot be realized will be further discussed with reference to FIG. 9. FIG. 9 shows a color matching function showing an ideal spectral characteristic of a color filter, in which the abscissa and ordinate indicate wave length and stimulus value (lumen) respectively, and a solid line $F_R$, a broken line $F_G$ and a dotted line $F_B$ indicate the ideal spectral characteristics of red, green and blue filters respectively.

If color mixture is performed with color signals of those ideal characteristics $F_R$, $F_G$ and $F_B$, it is possible to reproduce intermediate colors in the ideal reproducible area in FIGS. 8 and 10.

However, in FIG. 9, it is impossible with a conventional optical filter to obtain negative stimulus values $\alpha$, $\beta$, $\gamma$ and $\delta$ in which $F_R<0$, $F_G<0$ and $F_B<0$, and, therefore, these negative stimulus values (shown in the shaded portion in FIG. 9) are obtained as a zero stimulus value, so that in fact, obtained are characteristics $F'_R$, $F'_G$ and $F'_B$ in which positive stimulus values are added to the ideal characteristics $F_R$, $F_G$ and $F_B$. This is why the narrowed reproducible area indicated by the dotted triangle taking (r), (g) and (b) as its apexes in FIGS. 8 and 10 exists in conventional devices.

Human eyes have a superior color resolution to intermediate colors positioned on the line connecting the blue (B) and the green (G) points in FIGS. 8 and 10 and therefore, it is extremely important to improve color reproducibility in this area.

SUMMARY OF THE INVENTION

It is therefore an object of the present invention to solve the foregoing problems, that is, to provide a solid state pickup system which realizes color reproduction more closely approximating a theoretical color reproduction, that is, reproducibility is improved by making a color reproducible area larger than a conventional one.

In order to attain the foregoing object, according to the present invention, at least one or more color filters are additionally provided to obtain a color signal of a wave length band corresponding to negative stimulus values (hereinafter referred to as 'negative sensitivity') to a solid state pickup apparatus including color filters of complementary colors to red, green and blue, and a color signal obtained by an additionally provided color filter is subtracted from a color signal in a surveyed complementary color system, so as to form a color signal which has a component of negative sensitivity and is, therefore, closer to an ideal color signal.

The principle of the present invention will be further described with reference to FIG. 9. Ideally, for example, in the case of three primary colors, negative sensitivity of red is in the wave length range of about from 460 nm to 530 nm, negative sensitivity of green is in the wave length ranges of from about 400 nm to 460 nm and from 640 nm to 680 nm, and negative sensitivity of blue is in the wave length range of about from 530 nm to 620 nm. Also cyan (C), magenta (M) and yellow (Y) in a complementary color system can be described in the same manner from the above-mentioned relational expressions. Since these negative sensitivities cannot be detected by a conventional optical filter, an optical filter having a spectral characteristic similar in wave length to the negative sensitivity areas is provided in addition to a conventional optical filter, in such a way that a color signal corresponding to negative sensitivity obtained by the new optical filter is subtracted from a color signal in a surveyed complementary color system, so as to form a color signal nearer an ideal one.

In order to also attain the foregoing object, according to the present invention, the solid state pickup system comprises a first photodetector element having a spectral characteristic of blue, a second photodetector element having a spectral characteristic of green including a wave length range corresponding to a red negative sensitive area, and a third photodetector element having a spectral characteristic of green and red the wave length range of which is longer than the red negative sensitive area, whereby processing is performed in a manner such that a color signal produced in the second photodetector element is subtracted from a color signal produced in the third photodetector element at a predetermined rate so as to form a new red color signal, and color mixture is performed on the basis of the new red color signal and blue and green color signals respectively produced in the first and second photodetector elements.

The principle of the present invention will be further described with reference to FIGS. 1 and 9. Ideally, for example, in FIG. 9, negative sensitivity of red is in the wave length range of about from 460 nm to 530 nm (the portion of $\beta$), negative sensitivity of green is in the wave length ranges of about from 400 nm to 460 nm and from 640 nm to 680 nm (the portions of $\alpha$ and $\delta$), and negative sensitivity of blue is in the wave length range of about from 530 nm to 620 nm (the portion of $\gamma$).

However, red, blue and green photodetector elements provided with conventional optical filters cannot detect these negative sensitivities. Accordingly, the photodetection portion of the solid state pickup apparatus is provided with a first photodetector element having a blue spectral characteristic (shown by the dotted line $f_B$) in the wave length range shown in FIG. 1, a second photodetector element having a green spectral characteristic (shown by the broken line $f_G$), and a third photodetector element having a spectral characteristic in a green long wave range and also having a red spectral characteristic (shown by the solid line $f_{or}$). Then, in FIG. 1, a color signal produced in the second photodetector element is subtracted from a color signal produced in a third photodetector element, so as to form a new red color signal having a red component in a long wave length range and a red negative sensitive component (with reference to the shaded portion $\beta'$ in FIG. 1).

Such a new color signal formed by a subtraction processing approximates an ideal red color signal (having a characteristic of the solid line $F_R$) shown in FIG. 9.

Alternatively, together with the formation of the new red color signal, green and red color signals produced in the second and third photodetector elements may be subtracted from a blue color signal produced in the first photodetector element at a predetermined rate, so as to form a new blue color signal having a blue negative sensitivity $\gamma$ in FIG. 9.

Alternatively, together with the formation of the new red color signal, blue and red color signals produced in the first and third photodetector elements may be subtracted from a green color signal produced in the second photodetector element at a predetermined rate, so as to form a new green color signal having green negative sensitivities $\alpha$ and $\delta$ in FIG. 9.

In such a solid state pickup system, since it is possible to form, in a pseudo manner, red, blue and green color signals which include a component of negative sensitivity and are therefore closer to the ideal situation, it is possible to expand a color reproducible area in comparison with a conventional reproducible area. Particularly, from the point of view of human eyes having a very superior resolution to intermediate colors between blue (B) and green (G) (intermediate colors in the side of cyan in the complementary color system), improving reproducibility of the intermediate colors by adding a component of red negative sensitivity contributes to the provision of a clear reproduced picture image. Accordingly, it is preferable to perform the processing with respect to at least red (R).

The present invention is not to be limited to a pickup system of a single plate or multi-plate type, and is applicable also to a television monitor in which a color picture tube is used for a reproduction system, a copy machine in which a color photosensitive material is used for a hard copy, or other various picture apparatuses.

BRIEF DESCRIPTION OF THE DRAWINGS

FIG. 15 shows a first alternative to the system shown in FIG. 13.

FIG. 16 shows a second alternative to the system shown in FIG. 13.

DETAILED DESCRIPTION OF THE PREFERRED EMBODIMENTS

A first embodiment of the present invention will be described with reference to the drawings.

Figure 2:
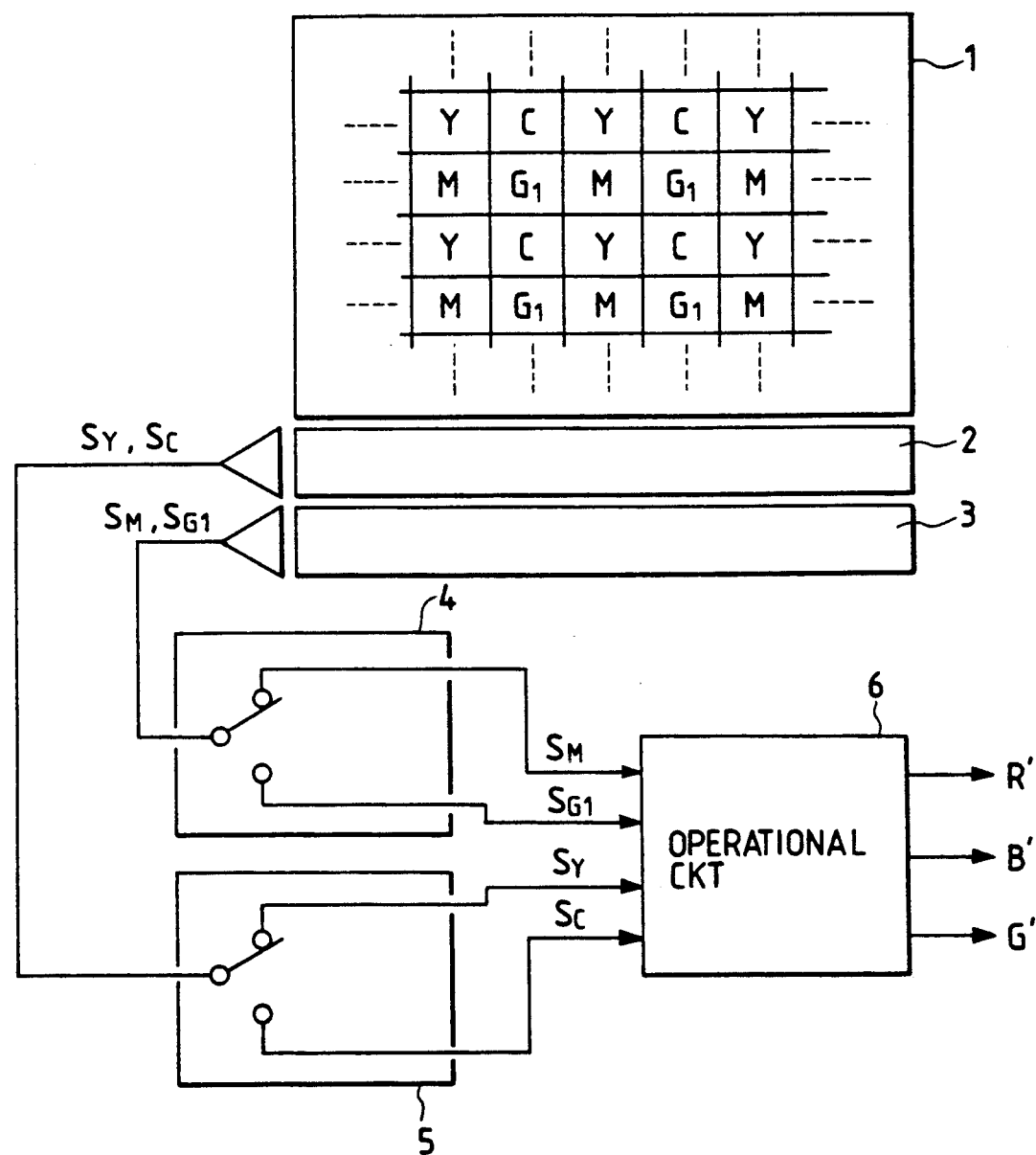
FIG. 2 shows an image processing system according to a first preferred embodiment of the present invention.
Figure 3:
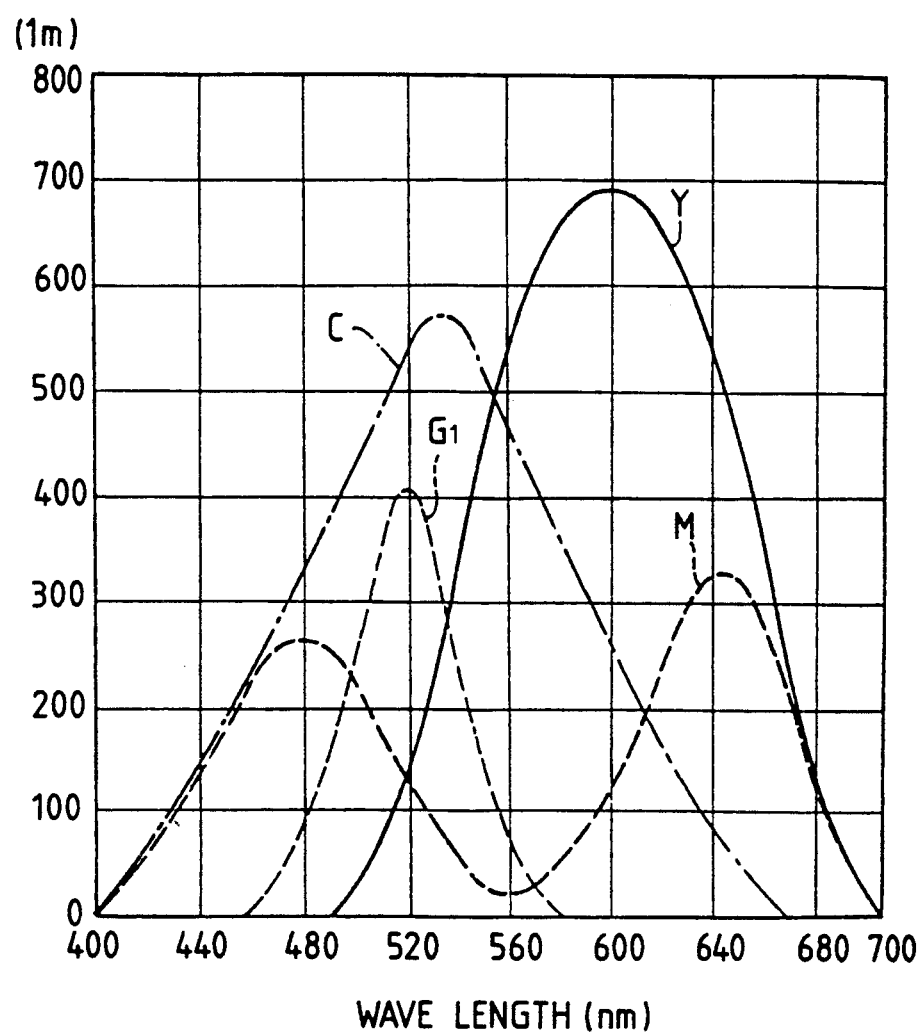
FIG. 3 shows the filter characteristics for a first preferred embodiment of the present invention.

FIG. 2 shows a system in the case where an image is picked up by a charge coupled type solid state pickup device (CCD). First, the configuration will be described. The reference numeral 1 represents a photodetection portion in which a number of photodetector elements are arranged in a matrix. For example, the photodetector elements are arranged in 1000 rows in the vertical scanning direction and 800 columns in the horizontal scanning direction so as to correspond to 800,000 picture elements in total. Those photodetector elements are provided with complementary color filters respectively in a manner so that a first row along which very small filters Y and C for producing yellow and cyan color signals respectively are provided alternately and a second row along which very small filters M and $G_1$ for producing magenta and green color signals respectively are provided alternately are formed alternately in the vertical scanning direction. As shown in FIG. 3, the green filter $G_1$ has a spectral sensitivity of the range of about from 460 nm to 530 nm, the cyan filter C has a spectral sensitivity of the range of about from 400 nm to 680 nm, the yellow filter Y has a spectral sensitivity of the range of about from 480 nm to 700 nm, and the magenta filter M has a spectral sensitivity of the blue and red components in the range of about from 400 nm to 700 nm. Such optical filters having such spectral characteristics are formed by, for example, dyeing a very small pattern of casein, gelatin or the like with a suitable coloring matter.

The reference numerals 2 and 3 represent horizontal charge transfer lines for serially transferring/outputting signal charges by the next horizontal scanning period, which signal charges are transferred in pairs of two adjacent rows from the photodetection potion 1 synchronously with one horizontal scanning period. That is, signal charges produced in photodetector elements of the first and second lines adjacent to each other are read out in a pair at the same time by vertical scanning. Specifically, the signal charges relating to the yellow (Y) and cyan (C) in the first row are read out through the horizontal charge transfer line 2, and the signal charges related to the magenta (M) and green ($G_1$) in the second row are read out through the horizontal charge transfer line 3 at the same time.

The reference numeral 4 represents a multiplexer which performs a switching operation synchronously with a dot sequential cycle so as to separate magenta and green color signals $S_M$ and $S_{G1}$ from each other, and 5 represents a multiplexer which performs a switching operation synchronously with a dot sequential cycle so as to separate yellow and cyan color signals $S_Y$ and $S_C$ from each The reference numeral 6 represents an operational circuit, which performs the following operations (1) to (7) on the basis of the separated individual color signals $S_M$, $S_{G1}$, $S_Y$ and $S_C$ so as to form new color signals of red (R'), blue (B') and green (G') compensated with negative sensitive components. First, color signals $S_M(t)$, $S_{G1}(t)$, $S_Y(t)$ and $S_C(t)$ output from the multiplexers 4 and 5 synchronously with a predetermined timing are converted into three primary color signals, that is, red, blue and green color signals $S_R(t)$, $S_B(t)$ and $S_G(t)$, by the processing based on the following expressions (1) to (3).

$$S_R(t) = \tfrac{1}{2}\{S_Y(t)+S_M(t)-S_C(t)\} \tag{1}$$

$$S_G(t) = \tfrac{1}{2}\{S_Y(t)+S_C(t)-S_M(t)\} \tag{2}$$

$$S_B(t) = \tfrac{1}{2}\{S_C(t)+S_M(t)-S_Y(t)\} \tag{3}$$

Figure 9:
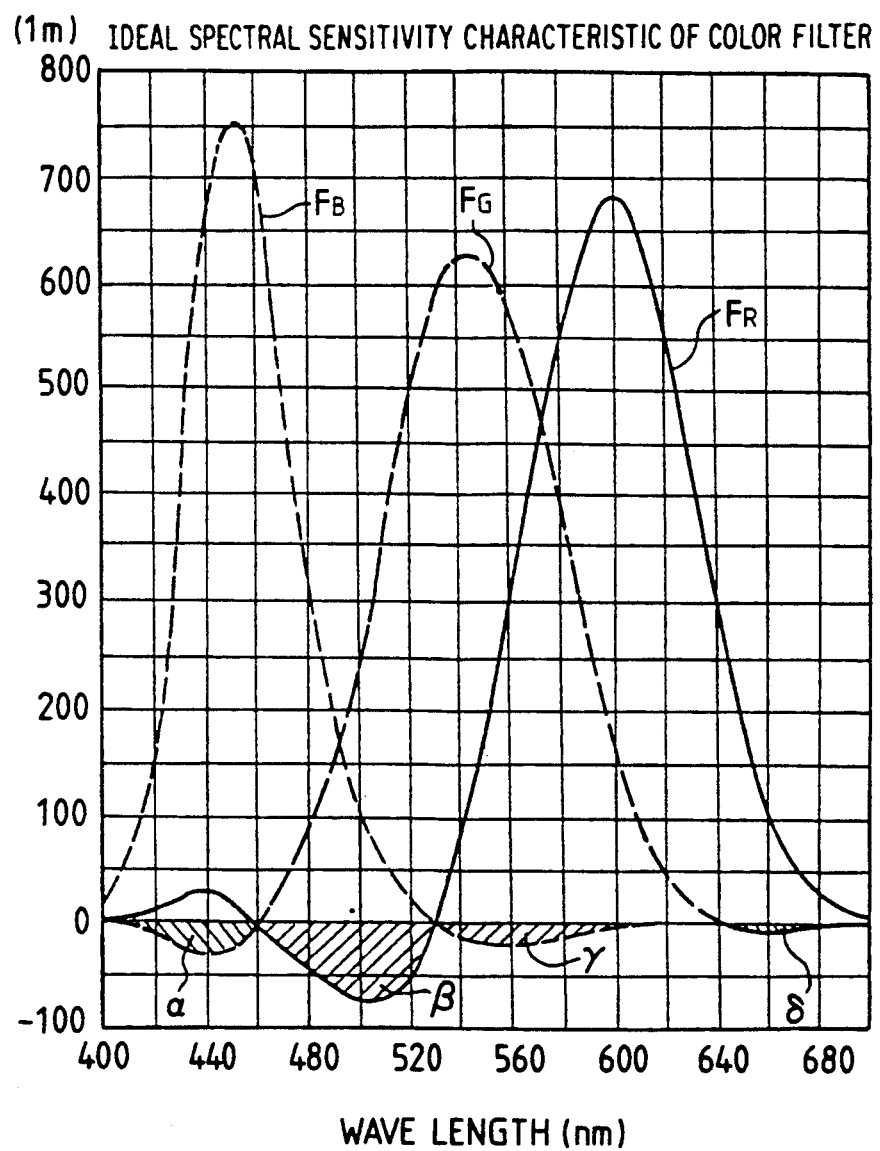
FIG. 9 is a diagram of a color matching function having an ideal spectral characteristic.
Figure 10:
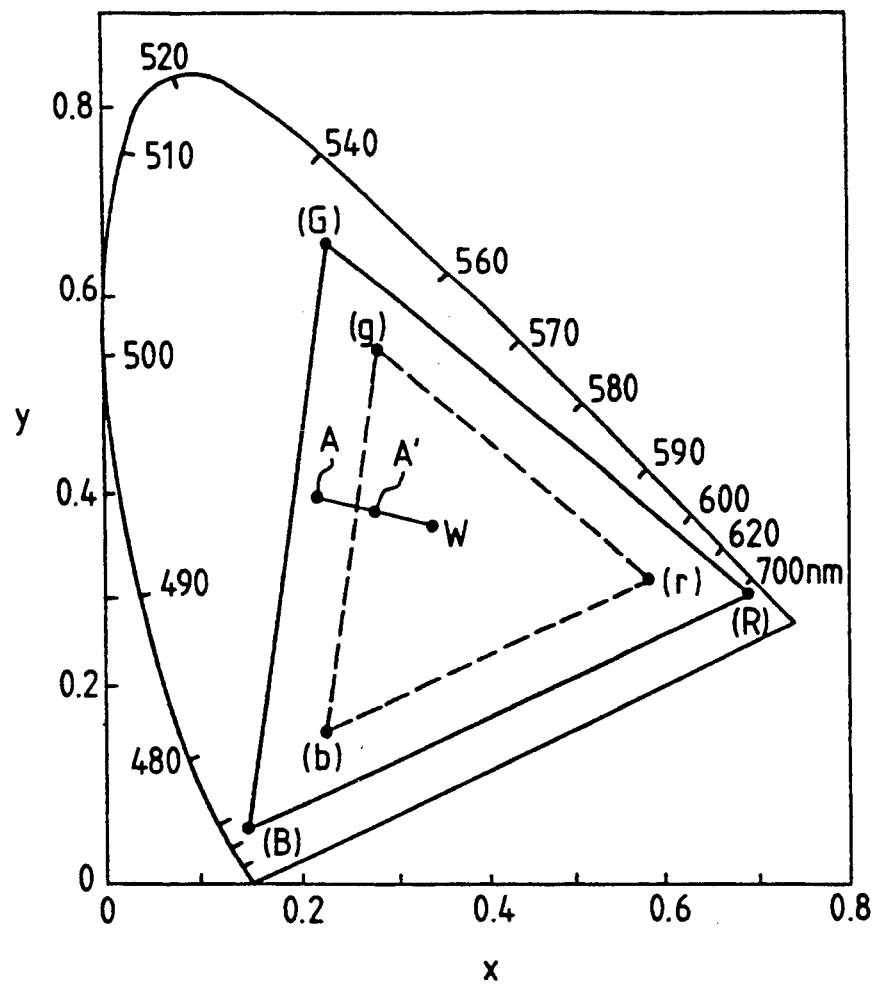
FIG. 10 is another chromaticity diagram for explaining problems in a conventional pickup system.

Next, a negative sensitive component $\beta$ in FIG. 9 is subtracted from the red component $S_R(t)$ obtained by the above expression (1), based on the following expression (4).

$$\begin{aligned} R'(t) &= S_R(t) - \beta \\ &= S_R(t) - k_1 \times S_{G1}(t) \end{aligned} \tag{4}$$

Next, negative sensitive components $\alpha$ and $\delta$ in FIG. 9 are subtracted from the green component $S_G(t)$ obtained by the above expression (2), based on the following expression (5).

$$\begin{aligned} G'(t) &= S_G(t) - \alpha - \delta \\ &= S_G(t) - k_2 \times S_B(t) - k_3 \times S_R(t) \end{aligned} \tag{5}$$

Next, a negative sensitive component $\gamma$ in FIG. 9 is subtracted from the blue component $S_B(t)$ obtained by the above expression (3), based on the following expression (6).

$$\begin{aligned} B'(t) &= S_B(t) - \gamma \\ &= S_B(t) - k_4 \times S_G(t) \end{aligned} \tag{6}$$

Here, $k_1$ to $k_4$ are coefficients established in advance according to experiments and so on, and they are determined through adjustment so as to obtain the color signals R'(t), B'(t) and G'(t) as close to the true ideal values as possible.

The arrangement of filters are not limited to the case where Y, C, Y, C ... are alternately arranged in each first row and M, $G_1$, M, $G_1$, ... are alternately arranged in each second row, but each first row may be composed of Y, C, Y, C ... and each second row may be composed of M, $G_1$, M, $G_1$, ... and $G_1$, M, G, M, ... alternately. That is, it suffices that mosaic filters in each of which yellow (Y), cyan (C), magenta (M) and green (G) are disposed adjacent to one another are disposed desirably and are subject to switching control by means of the multiplexers 4 and 5.

With the above expression (4), it is possible to form a red signal near an ideal one (with reference to the line $F_R$ in FIG. 9) which includes a negative sensitive component in the range of from 460 nm to 530 nm in FIG. 9.

With the above expression (5), it is possible to form, in a pseudo manner, a green signal near an ideal one (with reference to the dotted line $F_G$ in FIG. 9) which includes negative sensitive components in the range of about from 400 nm to 460 nm and the range of about from 640 nm to 680 nm in FIG. 9.

With the above expression (6), it is possible to form a blue signal near an ideal one (with reference to the dotted line $F_B$ in FIG. 9) which includes a negative sensitive component in the range of from 530 nm to 620 nm in FIG. 9.

Figure 8:
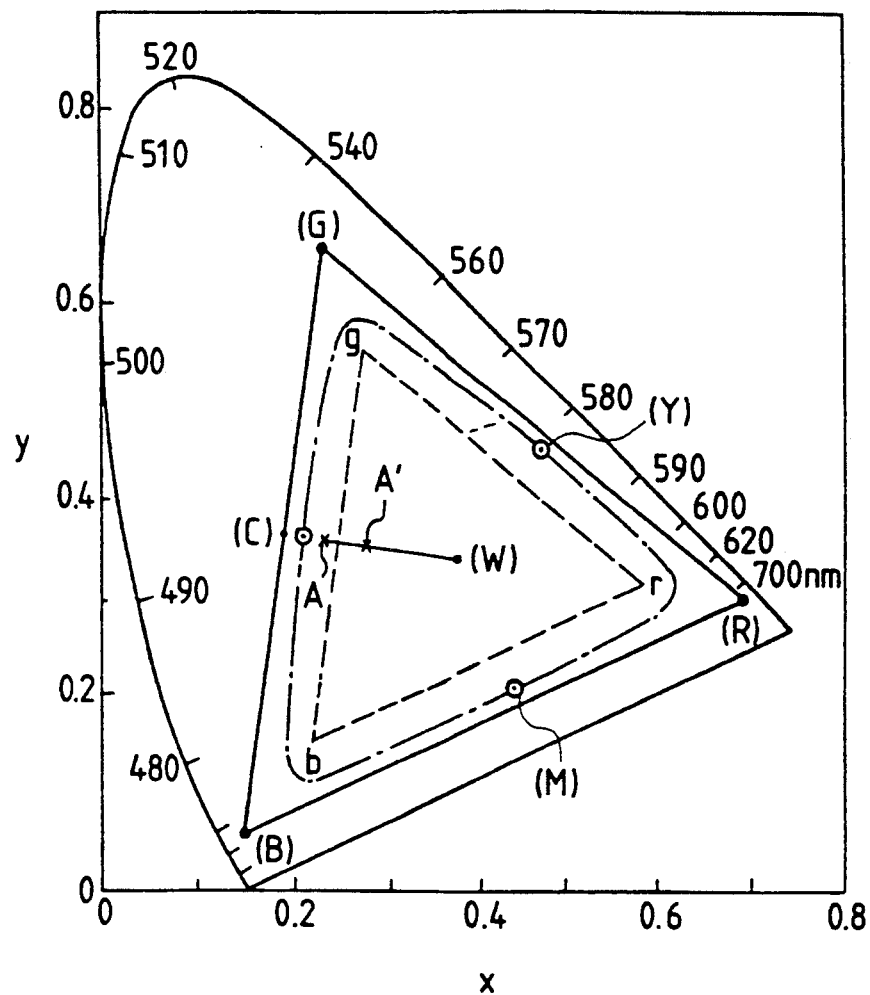
FIG. 8 is a chromaticity diagram for explaining problems in a conventional pickup system.

That is, the color signals R'(t), G'(t) and B'(t) formed in accordance with the expressions (4) to (6) approach their ideal spectral characteristics shown in FIG. 9 and are nearer the ideal three primary colors (R), (G) and (B) than the apexes (r), (g) and (b) of the triangle shown by dotted lines in FIG. 8 at the same time, so that it is possible to expand a color reproducible area.

For example, if a luminance or color difference signal in accordance with a standard television system is formed on the basis of these new color signals R'(t), G'(t) and B'(t), it is possible to obtain a clear reproduced picture in comparison with the conventional color signals.

Although operational processing has been performed in this first embodiment in a manner so that negative sensitive components are taken into consideration with respect to all the red, blue and green color signals as shown in the above expressions (4) to (6), a large effect may be produced even only by improving color reproducibility of intermediate colors on the line between blue (B) and green (G) to which human eyes have a superior sensitivity, and in this case, the coefficients in the above expressions (4) to (6) are established as follows.

$$k_1 \neq 0 \qquad (7)$$
$$k_2 = k_3 = k_4 = 0$$

Figure 4:
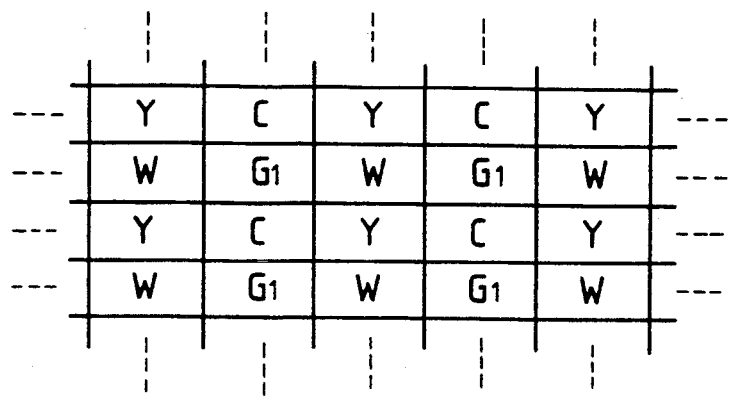
FIG. 4 is an explanatory diagram illustrating an arrangement of filters in a second embodiment.
Figure 5:
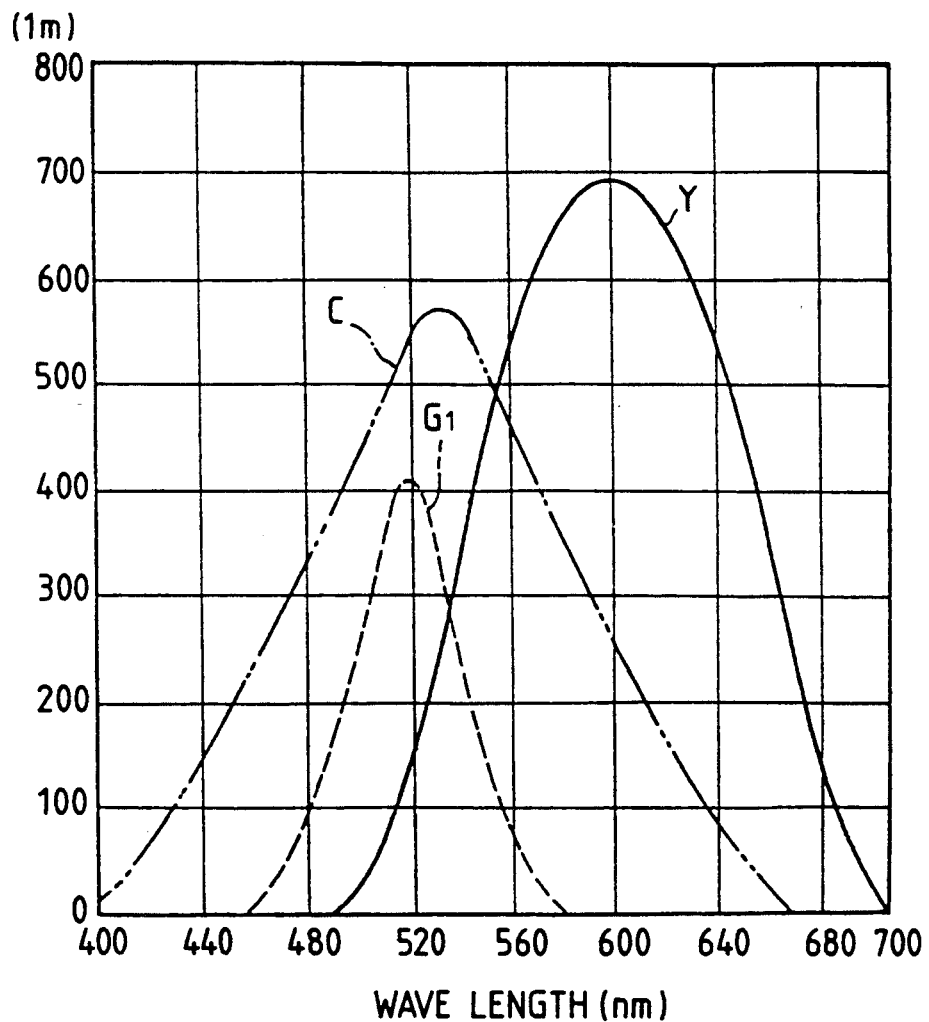
FIG. 5 is a diagram showing the characteristics of the filters shown in FIG. 4.

Next, a second embodiment will be described with reference to FIGS. 4 and 5. In this embodiment, in the photodetection portion 1 of the solid state pickup apparatus shown in FIG. 2, cyan (C), yellow (Y), green ($G_1$) and white (W) filters having spectral characteristics shown in FIG. 5 are provided in the arrangement in FIG. 4. Since the white (W) filter has an almost uniform spectral characteristic all over the wave length range, the white (W) filter is not shown in FIG. 5.

First, as shown in FIG. 5, a cyan filter C has a spectral sensitivity in the range of about from 400 nm to 680 nm, and a yellow filter Y has a spectral sensitivity in the range of about from 480 nm to 700 nm, and a green filter $G_1$ is set to have a spectral sensitivity in the range of about from 460 nm to 530 nm correspondingly to a red negative sensitive area (with reference to FIG. 9).

In the same manner as in the above-mentioned first embodiment, color signals produced in respective photodetector elements are separated suitably by multiplexers and supplied to an operational circuit so as to be subjected to operational processing shown in the following expressions (8) to (14) so that color signals R', G' and B' near ideal ones which include negative sensitive components are formed.

That is, first, yellow, cyan, white and green color signals $S_Y(t)$, $S_C(t)$, $S_W(t)$ and $S_{G1}(t)$ output from the multiplexers synchronously with the timing of dot sequential scanning are converted to red, blue and green color signals $S_R(t)$, $S_B(t)$ and $S_G(t)$, by a processing operation in accordance with the following expressions (8) to (10).

$$S_R(t) = S_W(t) + S_C(t) \qquad (8)$$

$$S_G(t) = S_Y(t) + S_C(t) - S_W(t) \qquad (9)$$

$$S_B(t) = S_W(t) - S_Y(t) \qquad (10)$$

Next, a negative sensitive component $\beta$ in FIG. 9 is subtracted from the red component $S_R(t)$ obtained by the above expression (8), based on the following expression (11).

$$\begin{aligned} R'(t) &= S_R(t) - \beta \\ &= S_R(t) - k_5 \times S_{G1}(t) \end{aligned} \qquad (11)$$

Next, negative sensitive components $\alpha$ and $\delta$ in FIG. 9 are subtracted from the green component $S_G(t)$ obtained by the above expression (9), based on the following expression (12).

$$\begin{aligned} G'(t) &= S_G(t) - \alpha - \delta \\ &= S_G(t) - k_6 \times S_B(t) - k_7 \times S_R(t) \end{aligned} \qquad (12)$$

Next, a negative sensitive component $\gamma$ in FIG. 9 is subtracted from the blue component $S_B(t)$ obtained by the above expression (10), based on the following expression (13).

$$\begin{aligned} B'(t) &= S_B(t) - \gamma \\ &= S_B(t) - k_8 \times S_G(t) \end{aligned} \qquad (13)$$

Here, $k_5$ to $k_8$ are coefficients established in advance according to experiments and so on, and they are determined through adjustment so as to obtain the color signals R'(t), B'(t) and G'(t) as close to the ideal values as possible.

Although operational processing has been performed in this second embodiment in a manner such that negative sensitive components are taken into consideration with respect to all the red, blue and green color signals as shown in the above expressions (11) to (13), a large effect may be produced even only by improving color reproducibility of intermediate colors on the line between blue (B) and green (G) to which human eyes have a superior sensitivity, and in this case, the coefficients in the above expressions (11) to (13) are established as follows.

$$k_5 \neq 0 \qquad (14)$$

$$k_6 = k_7 = k_8 = 0$$

As for the arrangement of filters, alternatively, as described with respect to the first embodiment, it suffices that mosaic filters in each of which yellow (Y), cyan (C), white (W) and green (G$_1$) are disposed adjacent to one another are disposed desirably and are subject to switching control by means of the multiplexers 4 and 5.

Figure 6:
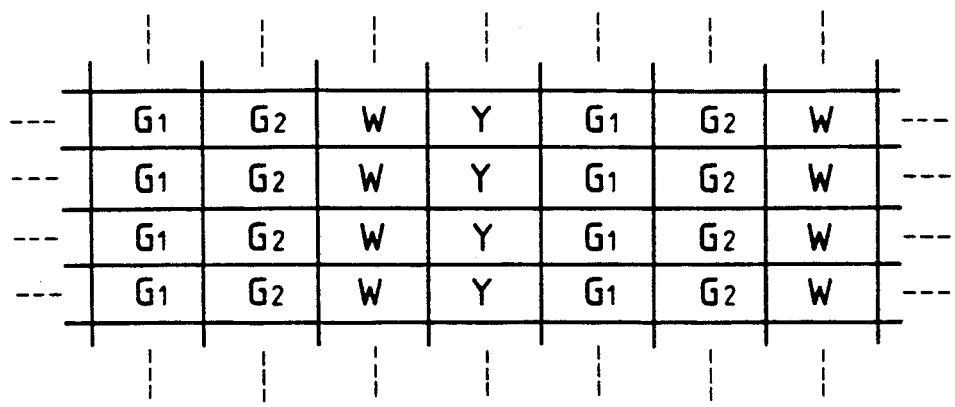
FIG. 6 is an explanatory diagram illustrating an arrangement of filters in a third embodiment.

Next, a third embodiment will be described with reference to FIGS. 6 and 7. In this third embodiment, in the photodetection portion 1 of the solid state pickup apparatus shown in FIG. 2, yellow (Y), first green (G$_1$), second green (G$_2$) and not-shown white (W) filters having spectral characteristics shown in FIG. 7 are provided in the arrangement as shown in FIG. 6.

Figure 7:
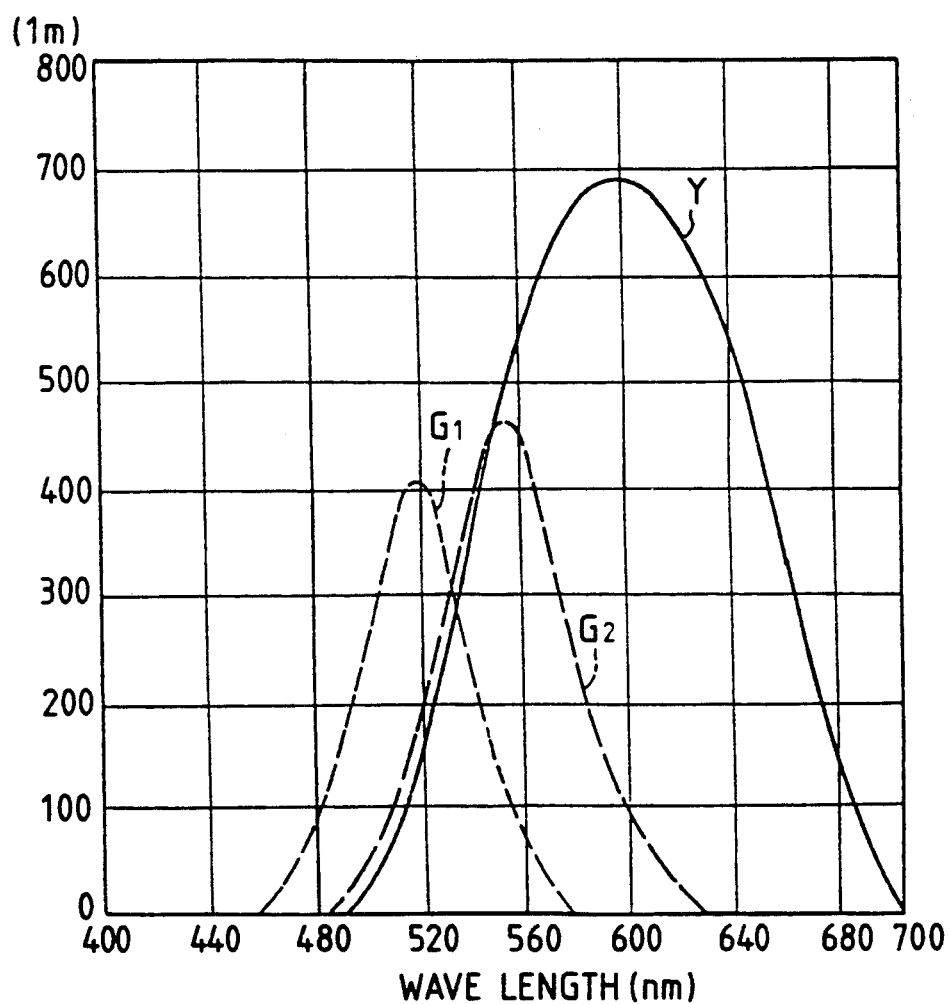
FIG. 7 is a diagram for showing the characteristics of the filters shown in FIG. 6.

First, as shown in FIG. 7, a yellow filter Y has a spectral sensitivity in the range of about from 480 nm to 700 nm, a first green filter G$_1$ has a spectral sensitivity in the range of about from 460 nm to 580 nm corresponding to a red negative sensitive area (with reference to FIG. 9), and a second green filter G$_2$ is set to have a spectral characteristic almost in the same range as F$_G$ in FIG. 9, that is, in the range of about from 460 nm to 640 nm when combined with the green filter G$_1$.

The very small filters are disposed alternatively repeatedly in the horizontal direction in such a manner that a first column is composed of G$_1$ filters, a second column is composed of G$_2$ filters, a third column is composed of W filters, and a fourth column is composed of Y filters, the first, second, the third and the fourth columns being relatedly arranged in order, thereby forming vertical stripes.

In the same manner as in the above-mentioned first embodiment, color signals produced in respective photodetector elements are separated suitably by means of multiplexers and supplied to an operational circuit so as to be subjected to operational processing in accordance with the following expressions (15) to (21), so that color signals R', G' and B' near ideal ones which include negative sensitive components are formed.

That is, first, first green, second green, white and yellow color signals S$_{G1}$(t), S$_{G2}$(t), S$_W$(t) and S$_Y$(t) respectively output from the multiplexers synchronously with the timing of dot sequential scanning are converted into red, blue and green color signals S$_R$(t), S$_B$(t) and S$_G$(t) respectively, by the processing operations shown in the following expressions (15) to (17).

$$S_R(t) = S_Y(t) - S_{G1}(t) - S_{G2}(t) \tag{15}$$

$$S_G(t) = S_{G1}(t) + S_{G2}(t) \tag{16}$$

$$S_B(t) = S_W(t) - S_Y(t) \tag{17}$$

Next, a negative sensitive component $\beta$ in FIG. 9 is subtracted from the red component S$_R$(t) obtained by the above expression (15), based on the following expression (18).

$$\begin{aligned} R'(t) &= S_R(t) - \beta \\ &= S_R(t) - k_9 \times S_{G1}(t) \end{aligned} \tag{18}$$

Next, negative sensitive components $\alpha$ and $\delta$ in FIG. 9 are subtracted from the green component S$_G$(t) obtained by the above expression (16), base on the following expression (19).

$$\begin{aligned} G'(t) &= S_G(t) - \alpha - \delta \\ &= S_G(t) - k_{10} \times S_B(t) - k_{11} \times S_R(t) \end{aligned} \tag{19}$$

Next, a negative sensitive component $\gamma$ in FIG. 9 is subtracted from the blue component S$_B$(t) obtained by the above expression (17), based on the following expression (20).

$$\begin{aligned} B'(t) &= S_B(t) - \gamma \\ &= S_B(t) - k_{12} \times S_G(t) \end{aligned} \tag{20}$$

Here, k$_9$ to k$_{12}$ are coefficients established in advance according to experiments and so on, and they are determined through suitable adjustment so as to obtain the color signals R'(t), B'(t) and G'(t) as close to the ideal true values as possible.

Although operational processing has been performed in this third embodiment in a manner so that negative sensitive components are taken into consideration with respect to the red, blue and green color signals as shown in the above expressions (18) to (20), a large effect may be produced even only by improving color reproducibility of intermediate colors on the line between blue (B) and green (G) to which human eyes have a superior sensitivity, and in this case, the coefficients in the above expressions (18) to (20) are established as follows.

$$\begin{aligned} k_9 &\neq 0 \\ k_{10} &= k_{11} = k_{12} = 0 \end{aligned} \tag{21}$$

Alternatively, the arrangement of filters may be made such that yellow (Y), white (W), green (G$_1$), (G$_2$), which are adjacent to one another, are rearranged desireably and are subject to switching control corresponding to the rearrangement by means of multiplexers.

A fourth embodiment of the present invention will now be described with reference to the drawings.

Figure 11:
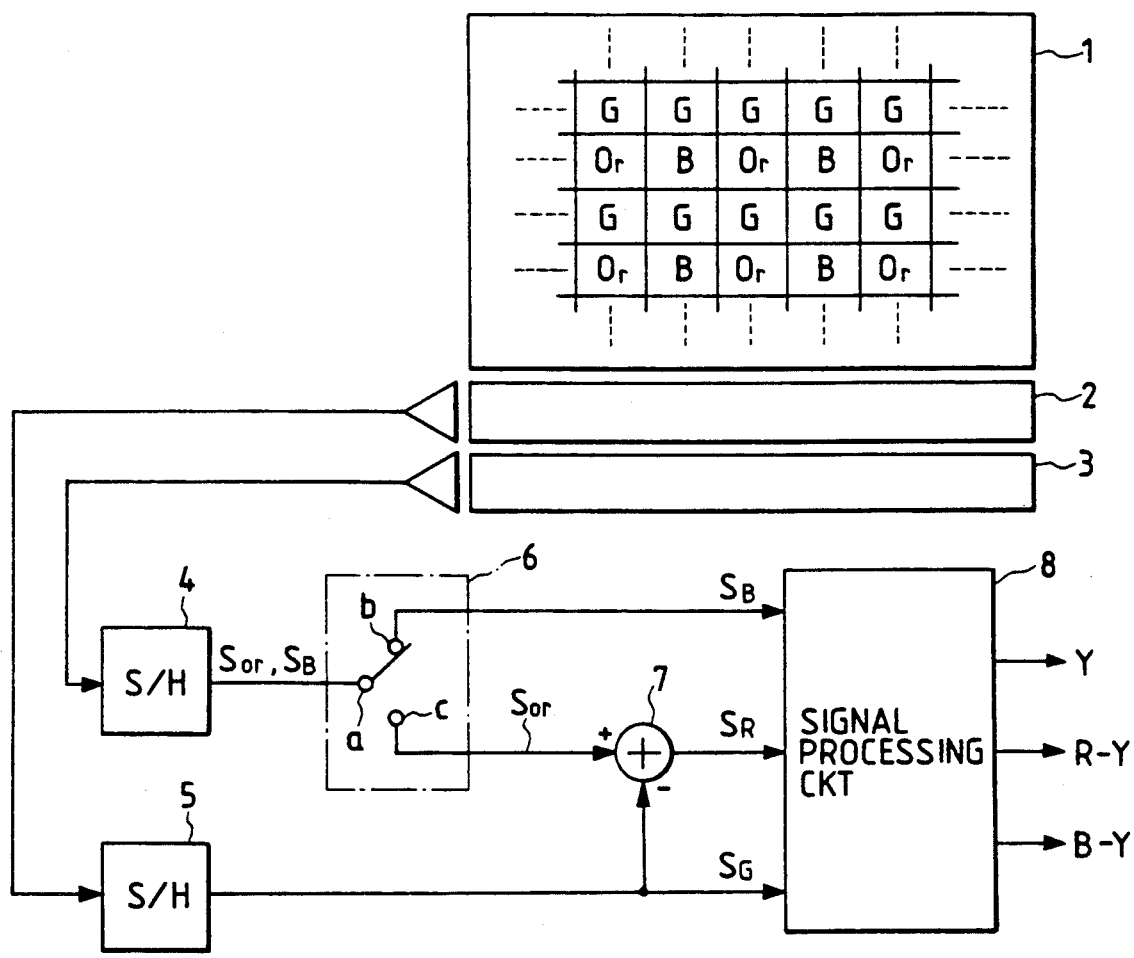
FIG. 11 shows an image processing system according to a fourth embodiment.

FIG. 11 shows a similar system to that shown in FIG. 2. In the photodetector elements, for this fourth embodiment, however, green stripe-shaped filters G are provided in odd number lines, and blue very small filters B and very small filters Or having a spectral characteristic shown by the solid line f$_{Or}$ in FIG. 1 are alternatively provided in even number lines.

Figure 1:
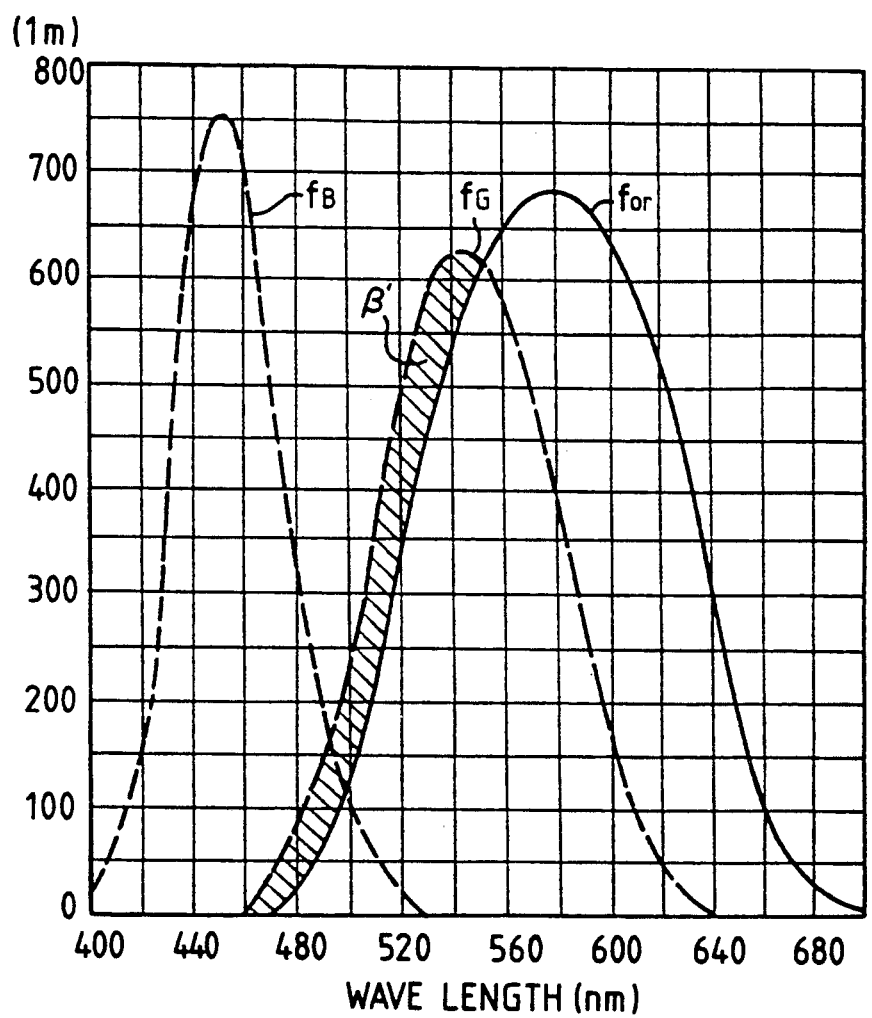
FIG. 1 shows the filter characteristics for a fourth preferred embodiment of the present invention.

As shown in FIG. 1, the blue filter B has a spectral sensitivity in the range of about from 400 nm to 540 nm, the green filter G has a spectral sensitivity in the range of about from 460 nm to 640 nm, and the very small filter Or has a spectral sensitivity in the range of about from 460 nm to 700 nm. For the sake of simplicity of description, a color signal produced in a photodetector element provided with the very small filter Or will be called the 'third color signal'.

The circuit of FIG. 11 (i.e., the fourth embodiment) differs from that of FIG. 2 (i.e., the first embodiment) in that the reference numeral 4 represents a sample-and-hold circuit for sampling and holding signals read out from the horizontal charge transfer line 3 synchronously with the timing of dot sequential scanning by a correlation double sampling system so as to output blue and third color signals S$_B$ and S$_{Or}$ corresponding to respective photodetector elements, and the reference numeral 5 represents a sample-and-hold circuit for sampling and holding signals read out from the horizontal charge transfer line 2 synchronously with the timing of dot sequential scanning by a correlation double sampling system so as to output a green color signal $S_G$ corresponding to respective photodetector elements.

The reference numeral 6 represents a multiplexer for performing a switching operation synchronously with the timing of dot sequential scanning, so as to transfer the color signals $S_B$ and $S_{Or}$ transferred to an input contact point a from the sample-and-hold circuit 4, to their predetermined output contact points b and c.

The reference numeral 7 represents a subtraction circuit for performing a subtraction processing of the following expression (22). That is, by subtracting the green color signal $S_G$ from the third color signal $S_{Or}$, the addition and subtraction circuit 7 outputs a new red color signal $S_R$.

$$S_R(t) = S_{Or}(t) - k_{13} \times S_G(t) \tag{22}$$

Here, the above expression (22) is expressed by a time function in order to show that the respective color signals are signals synchronous with the timing of dot sequential scanning, and the coefficient $k_{13}$ is a value obtained by experiments so as to obtain an optimum red color signal.

The reference numeral 8 represents a signal processing circuit for performing correction such as $\gamma$ correction, white balance and so on upon the color signals $S_R$, $S_C$ and $S_B$ as color signals in a RGB system, so as to form a luminance signal Y and color difference signals R−Y and B−Y by a matrix operational processing method.

According to this fourth embodiment, since it is possible to form a red color signal near an ideal one (with reference to the line $F_R$ in FIG. 9) including a negative sensitive component in the range of about from 460 nm to 530 nm, it is possible to improve color reproducibility, and at the same time, since it is possible to improve reproducibility of intermediate colors between blue (B) and green (G), it is possible to adapt to the characteristics of human eyes.

Although not shown, a subtraction circuit for performing a subtraction processing shown in the following expressions (23) and (24) may be provided to obtain a new signal $S'_G(t)$ by the processing of the following expression (23) and a new signal $S'_B(t)$ by the processing of the following expression (24), so as to form color difference signals and a luminance signal in the signal processing circuit 8 on the basis of the new color signals $S'_G(t)$ and $S'_B(t)$ as green and blue color signals, and the red color signal $S_R(t)$ obtained by the above expression (22).

$$S'_G(t) = S_G(t) - \{k_{14} \times S_B(t) + k_{15} \times S_R(t)\} \tag{23}$$

$$S'_B(t) = S_B(t) - \{k_{16} \times S_G(t) + k_{17} \times S_R(t)\} \tag{24}$$

Here, in the above expressions (23) and (24), the coefficients $k_{14}$ to $k_{17}$ are values obtained according to experiments so as to obtain the optimum green and blue color signals.

Using a processing method on the basis of the above expression (23), it is possible to form a blue color signal near an ideal one including a negative sensitive component in the range of about from 530 nm to 620 nm as shown in FIG. 9. Similarly, using a processing method on the basis of the above expression (24), it is possible to form a green color signal near an ideal one including a negative sensitive component in the ranges of about from 400 nm to 460 nm and of about from 640 nm to 700 nm in FIG. 9. Thus, it is possible to realize color reproduction near the ideal situation shown by the triangle having apexes R, G and B in FIG. 8.

When a processing method for making at least a red (R) color signal have a negative sensitive component is performed, it is necessary to set the coefficients in the above expressions (22) to (24) into the following relationship.

$$k_{14} = k_{15} = k_{16} = k_{17} = 0 \tag{25}$$
$$k_{13} \neq 0$$

Further, the arrangement of the filters in this fourth embodiment is not to be limited to that shown in FIG. 11, but other arrangements may be selected.

Figure 12:
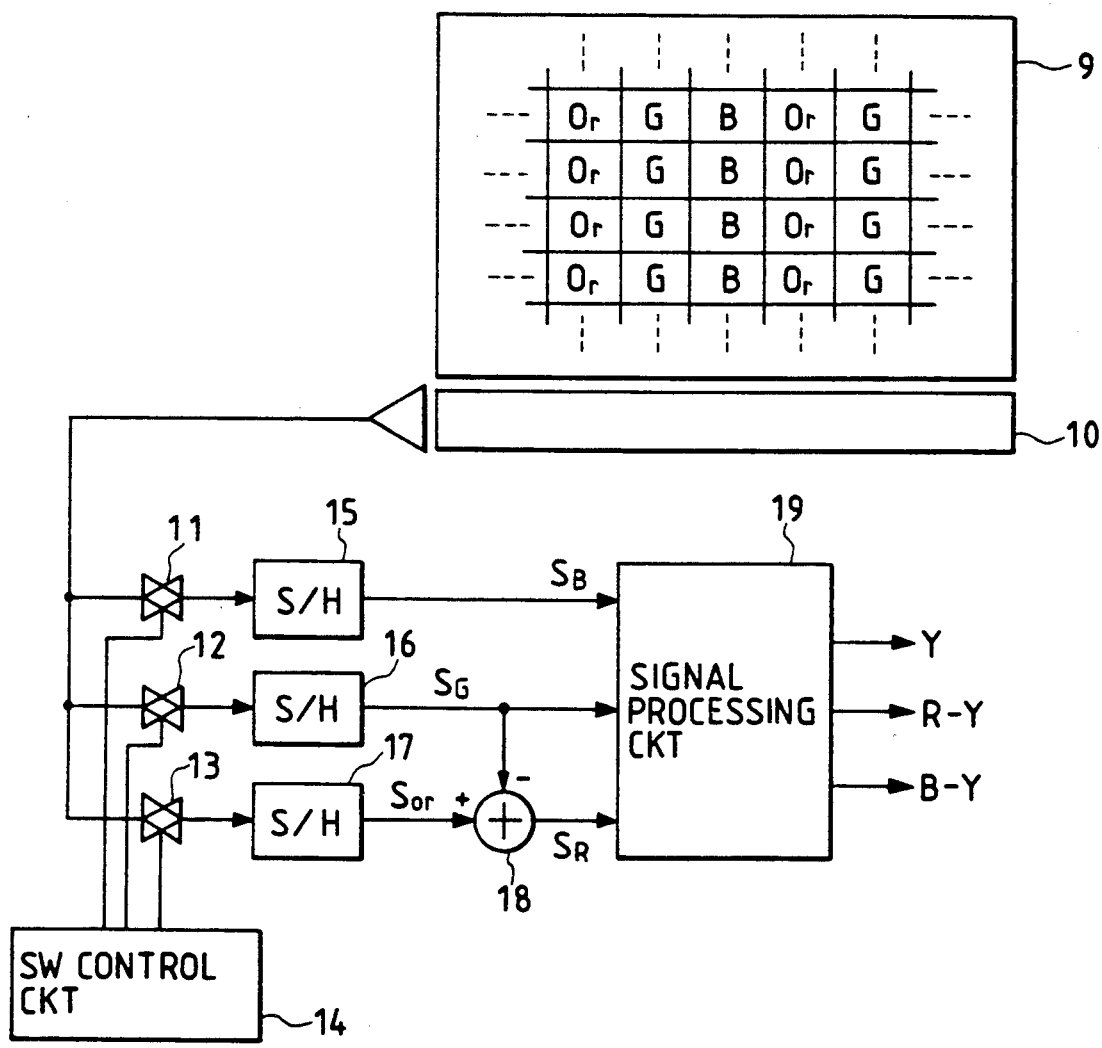
FIG. 12 shows an image processing system according to a fifth embodiment.

Next, a fifth embodiment will be described with reference to FIG. 12.

The reference numeral 9 represents a photosensitive matrix in which first, second and third photodetector elements respectively producing blue, green and third color signals B, G and Or are disposed in the first, second and third columns respectively, and the photodetection matrix 9 is constituted by a plurality of groups of those three columns arranged in the direction of horizontal scanning. A filter having a spectral characteristic shown by the dotted line $f_B$ in FIG. 1 is provided in the first photodetector element, a filter having a spectral characteristic shown by the line $f_G$ in FIG. 1 is provided in the second photodetector element, and a filter having a spectral characteristic shown by the line $f_{Or}$ in FIG. 1 is provided in the third photodetector element.

The reference numeral 10 represents a horizontal charge transfer line for serially transferring and outputting, by the next horizontal scanning period, signal charges transferred line by line from the photodetection matrix 9 synchronously with one horizontal scanning period.

The reference numerals 11 to 13 represent multiplexers for separating signals, which are read out from the horizontal charge transfer line 10 in time-division synchronously with the timing of dot sequential scanning, into signals corresponding to respective photodetector elements under the control of a switch control circuit 14, the separated signals being transferred to sample-and-hold circuits 15 to 17 respectively.

The sample-and-hold circuits 15 to 17 output color signals $S_{Or}$, $S_B$ and $S_G$ of three colors corresponding to Or, B and G synchronously by double sampling.

The reference numeral 18 represents a subtraction circuit for performing a subtraction processing of the above expression (22). That is, by subtracting the color signal $S_G$ from the color signal $S_{Or}$, the addition and subtraction circuit 18 outputs a new red color signal $S_R$.

The reference numeral 19 represents a signal processing circuit for performing correction such as $\gamma$ correction, white balance and so on upon the color signals $S_R$, $S_G$ and $S_B$ as color signals in an RGB system, so as to form a luminance signal Y and color difference signals R−Y and B−Y by a matrix operational processing method.

According to this fifth embodiment, since it is possible to form a red color signal near an ideal one (with reference to the line $F_R$ in FIG. 9) including a negative sensitive component in the range of about from 460 nm to 530 nm, it is possible to improve color reproducibility, and at the same time, since it is possible to improve reproducibility of intermediate colors between blue (B) and green (G), it is possible to adapt to the characteristics of human eyes.

Although not shown, a subtraction circuit for performing a subtraction processing shown in the preceding expressions (23) and (24) may be provided to obtain a new signal $S'_G(t)$ by the processing of the following expression (23) and a new signal $S'_B(t)$ by the processing of the following expression (24), so as to form color difference signals and a luminance signal in the signal processing circuit 19 on the basis of the new color signals $S'_G(t)$ and $S'_B(t)$ as green and blue color signals, and the red color signal $S_R(t)$ obtained by the above expression (22).

A sixth embodiment of the present invention will now be described with reference to the drawings.

Figure 13:
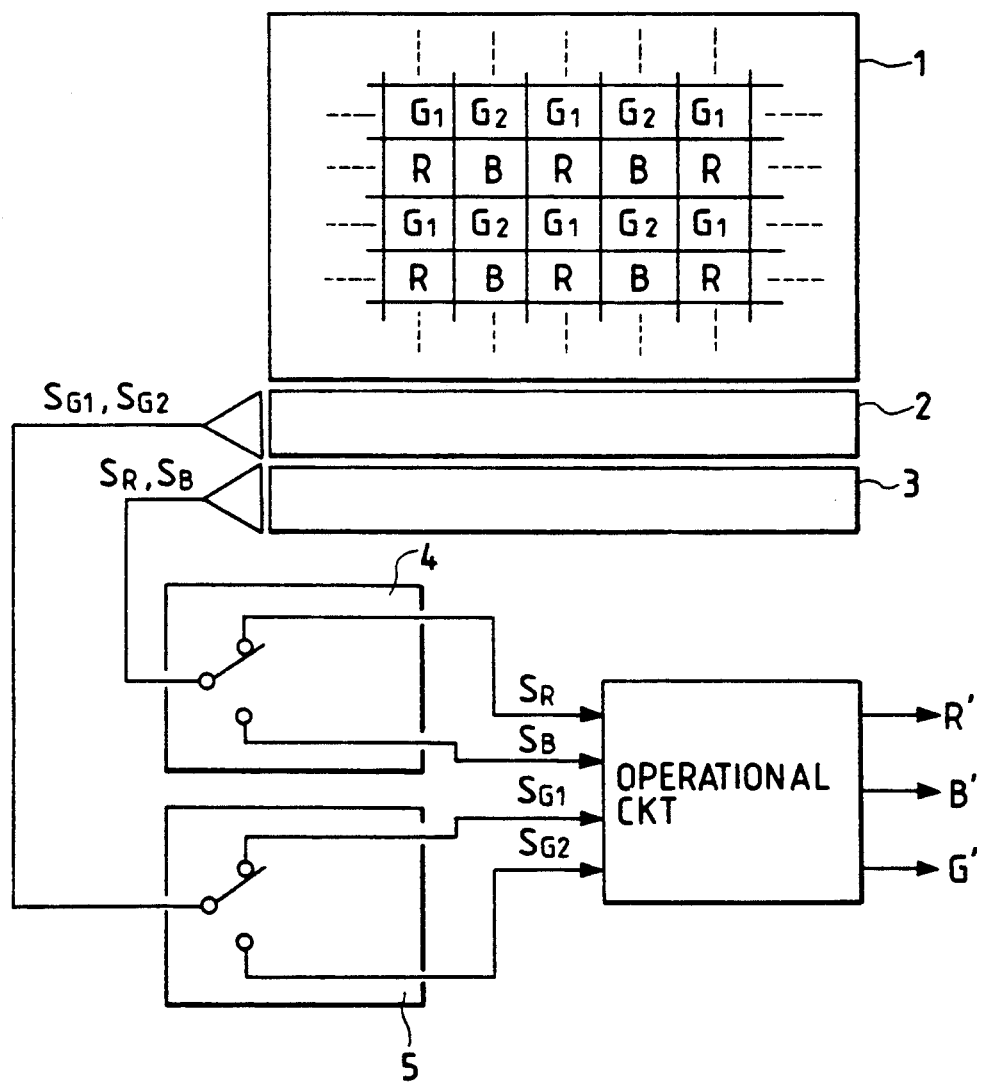
FIG. 13 shows an image processing system according to a sixth embodiment.
Figure 14:
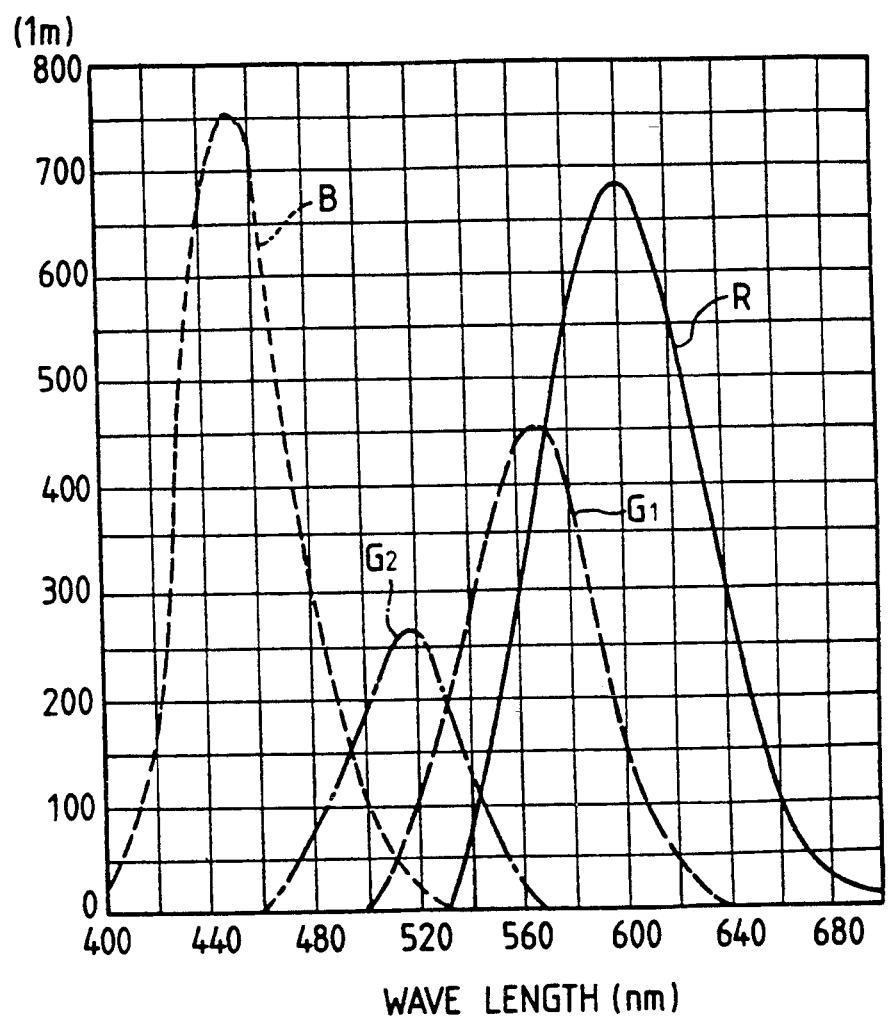
FIG. 14 shows the characteristics of the filters shown in FIG. 13.

FIG. 13 shows a similar system to the first embodiment of FIG. 2. FIG. 13 differs from FIG. 2 in that the FIG. 13 photodetector elements have an arrangement in which a first row along which two kinds of very small filters $G_1$ and $G_2$ for producing green color signals respectively are provided alternately and a second row along which very small filters R and B for producing red and blue color signals respectively are provided alternately, are formed alternately in the vertical scanning direction. As shown in FIG. 14, the green filter $G_1$ has spectral sensitivity in the range of about from 500 nm to 640 nm, the green filter $G_2$ has spectral sensitivity in the range of about from 460 nm to 580 nm, the red filter R has spectral sensitivity in the range of about from 520 nm to 700 nm, and the blue filter B has spectral sensitivity in the range of about from 400 nm to 540 nm. Design is made such that the sensitivity range of the green filter $G_2$ is established so as to be substantially equal to the negative sensitivity range of the red filter (see FIG. 9) and that a spectral characteristic in the wave length range of about from 460 nm to 640 nm is obtained if the respective spectral characteristics of the green filters $G_1$ and $G_2$ are combined. Such an optical filter having a spectral characteristic is formed by, for example, dyeing a very small pattern of casein, gelatin or the like with a suitable coloring matter.

In FIG. 13 the reference numeral 6 represents an operational circuit, which performs the following operations (26) to (28) on the basis of the separated individual color signals $S_R$, $S_B$, $S_{G1}$ and $S_{G2}$ so as to form new color signals of red (R'), blue (B') and green (G') compensated with negative sensitive components.

Assume that the color signals output from the multiplexers 4 and 5 synchronously with predetermined timings are represented by time functions $S_R(t)$, $S_B(t)$, $S_{G1}(t)$ and $S_{G2}(t)$, and the new color signals are represented by time functions R'(t), B'(t), G'(t), B'(t) and G'(t), then:

$$G'(t)=S_{G1}(t)+k_{18}\times S_{G2}(t) \\ -\{k_{19}\times S_B(t)+k_{20}\times S_R(t)\} \quad (26)$$

$$R'(t)=S_R(t)-k_{21}\times S_{G1}(t) \quad (27)$$

$$B'(t)=S_B(t)-\{k_{22}\times S_{G1}(t)+k_{23}\times S_R(t)\} \quad (28)$$

Here, $k_{18}$ to $k_{23}$ are coefficients established in advance according to experiments and so on, and they are determined through adjustment so as to obtain the color signals R'(t), B'(t) and G'(t) as close to the ideal true values as possible.

In this sixth embodiment, filters for detecting the negative sensitivity of red and blue are not separately provided, but the blue and red filters B and R and the green filter $G_1$ are used for detecting the negative sensitivity of the red and blue components, so that the resolution of the photodetection region is prevented from being lowering.

With the above expression (26), it is possible to form, in a pseudo manner, a green signal near an ideal one (with reference to the line $F_G$ in FIG. 9) which includes negative sensitive components in the range of about from 400 nm to 460 nm and in the range of about from 640 nm to 680 nm in FIG. 9.

With the above expression (27), it is possible to form a red signal near an ideal one (with reference to the line $F_R$ in FIG. 9) which includes a negative sensitive component in the range of from 460 nm to 530 nm in FIG. 9.

With the above expression (28), it is possible to form a blue signal near an ideal one (with reference to the broken line $F_B$ in FIG. 9) which includes a negative sensitive component in the range of from 530 nm to 620 nm in FIG. 9.

That is, the color signals R'(t), G'(t) and B'(t) formed in accordance with the expressions (26) to (28) approach their ideal spectral characteristics shown in FIG. 9 and are nearer the ideal three primary colors (R), (G) and (B) rather than being at the apexes (r), (g) and (b) of the triangle shown by dotted lines in FIG. 8 at the same time, so that it is possible to greatly expand a color reproducible area.

For example, if a luminance or color difference signal in accordance with a standard television system is formed on the basis of these new color signals R'(t), G'(t) and B'(t), it is possible to obtain a clear reproduced picture in comparison with a conventionally produced picture.

Although operational processing has been performed in this sixth embodiment in a manner such that negative sensitive components are taken into consideration with respect to the red, blue and green color signals as shown in the above expressions (26) to (28), a large effect may be produced even only by improving color reproducibility of intermediate colors on the line between blue (B) and green (G) to which human eyes have a superior sensitivity, and in this case, the coefficients in the above expressions (26) to (28) are established as follows.

$$k_{18}=k_{19}=k_{20}=k_{22}=k_{23}=0 \quad (29) \\ k_{21}\neq 0$$

The filter arrangement is not limited to that described in this sixth embodiment, but it is possible to use another filter arrangement as shown in FIG. 15, in which the filter $G_1$ for generating a green color signal for a high-band luminance signal is made to be a lateral stripe filter while the filter $G_2$ for compensating negative sensitivity characteristics and the red and blue filters are arranged alternately in the horizontal scanning direction, the former lateral stripe filter and the latter arrangement of $G_2$, R and B are arranged alternately. Alternatively, as shown in FIG. 16, stripe filters related to respective hues may be arranged so as to extend in the vertical scanning direction. Further, alternatively, although not shown, the filters may be arranged on a perfect chequered pattern. Thus, the arrangement per se is desiredly determined by the system designer. It is necessary to provide multiplexers or the like for surely separating the color signals from one another based on the chosen design.

As has been described, according to the present invention, a photodetector element having a spectral sensitivity to the wave length of at least a red negative sensitive area is provided, a color signal output from this photodetector element is subtracted from a complementary color signal or at least a red color signal at a suitable rate so as to form at least a new red (R') color signal, and this new red (R') color signal is applied as a red color signal in a composing processing circuit corresponding to color mixture so as to perform color reproduction. Accordingly, it is possible to reproduce an intermediate color which has not been able to be reproduced, and it is possible to provide a more natural and clearer reproduced picture.

As has been also described, according to the present invention, a solid state pickup apparatus includes a first photodetector element having a spectral characteristic of blue, a second photodetector element having a spectral characteristic of green including the wave length range corresponding to a red negative sensitive area, and a third photodetector element having a spectral characteristic of green and red in a longer wave range than the wave length range corresponding to the red negative sensitive area. At least a new red color signal is formed by subtracting a color signal produced in the second photodetector element from a color signal produced in the third photodetector element at a predetermined rate. The processing of color mixture is then performed on the basis of the new red color signal and blue and green color signals respectively produced in the first and second photodetector elements, so that it is possible to improve color reproducibility of intermediate colors between blue (B) and green (G) by adding at least a red negative sensitive component. Particularly from the point of view of human eyes having a superior color resolution to intermediate colors in this range, it is possible to provide a clearer reproduced picture.

What is claimed is:

1. A solid state pickup system in which an image is picked up by a plurality of photodetector elements for producing respective complementary color signals corresponding to stimulus values of respective colors in a complementary color system, and in which primary color signals in a three primary color (RGB) system are derived from said complementary color signals and are applied as inputs to a composing processing means which performs a color mixture operation thereby to realize color reproduction, said pickup system further comprising:
    another photodetector element having a spectral sensitivity corresponding to a spectral area of an intermediate color between blue (B) and green (G) in said three primary color (RGB) system; and
    first subtracting means for subtracting a signal, produced in said other photodetector element, from said complementary color signals at a predetermined rate to form a new red (R') color signal which is applied as an input to said composing processing means.

2. A solid state pickup apparatus as claimed in claim 1, wherein said other photodetector element also has a spectral sensitivity corresponding to a spectral area of an intermediate color between red (R) and green (G) in said three color (RGB) system; and further comprising second subtracting means for subtracting a signal, produced in said other photodetector element, from said complementary color signals at a predetermined rate also to form a new blue (B') color signal which is applied, along with said new red (R') color signal, as an input to said composing processing means.

3. A solid state pickup apparatus as claimed in claim 2, wherein said other photodetector element also has a spectral sensitivity corresponding to a spectral area of an intermediate color between red (R) and blue (B) in said three color (RGB) system; and
    further comprising third subtracting means for subtracting a signal, produced in said other photodetector element, from said complementary color signals at a predetermined rate also to form a new green (G') color signal, which is applied, along with said new red (R') and said new blue (B') color signals, as an input to said composing processing means.

4. A solid state pickup system in which an image is picked up by a group of photodetector elements for producing respective color signals corresponding to stimulus values of respective colors in a color specification system, in which said color signals are applied as inputs to a composing processing means which performs a color mixture operation thereby to realize color reproduction,
    wherein said group of photodetector elements is constituted by a first photodetector element having a spectral characteristic of blue, a second photodetector element having a spectral characteristic of green including a wavelength range corresponding to a red negative sensitive area, and a third photodetector element having a spectral characteristic of green and red the wavelength range of which is longer than said red negative sensitive area; and
    wherein said pickup system further comprises subtracting means for subtracting a color signal, produced by said second photodetector element, from a color signal, produced by said third photodetector element, at a predetermined rate to form a new red color signal which is applied as an input to said composing processing means along with blue and green color signals respectively produced by said first and second photodetector elements.

5. A solid state pickup system as claimed in claim 4, wherein said subtracting means further comprises additional subtracting means for subtracting green and red signals, respectively produced by said second and third photodetector elements, from a blue color signal, produced by said first photodetector element, at a predetermined rate, to form a new blue color signal which has a blue negative sensitivity and which is applied as an input to said composing processing means.

6. A solid state pickup system as claimed in claim 4, wherein said subtracting means further comprises additional subtracting means for subtracting blue and red color signals, respectively produced by said first and third photodetector elements, from a green color signal, produced by said second photodetector element, at a predetermined rate, to form a new green color signal which has a green negative sensitivity and which is applied as an input to said composing processing means.

7. A solid state pickup system in which an image is picked up by a plurality of photodetector elements for producing respective color signals corresponding to stimulus values of respective colors in a color specification system, and in which said color signals are applied as inputs to a composing processing means which performs a color mixture operation thereby to realize color reproduction, said pickup system further comprising:

another photodetector element having a spectral sensitivity corresponding to a spectral area of an intermediate color between blue (B) and green (G) in said color specification system; and a first subtracting means for subtracting a signal, produced by said other photodetector element from a red color signal (R), produced by one of said plurality of photodetector elements, at a predetermined rate to form a new red (R') color signal which is applied as an input to said composing processing means.

8. A solid state pickup system as claimed in claim 7, further comprising:

a second subtracting means for subtracting blue (B) and red (R) color signals, produced by said plurality of photodetector elements, from a green (G) color signal, produced by one of said plurality of photodetector elements, at predetermined rates respectively, thereby to form a new green (G') color signal which is applied as an input to said composing processing means thereby to realize color reproduction.

9. A solid state pickup system as claimed in claim 7, further comprising:

a third subtracting means for subtracting green (G) and red (R) color signals, produced by said plurality of photodetective elements, from a blue (B) color signal, produced by one of said plurality of photodetector elements, at predetermined rates respectively, thereby to form a new blue (B') color signal which is applied as an input to said composing processing means thereby to realize color reproduction.

10. A solid state pickup apparatus which uses photodetector elements to produce color signals, comprising:

photodetector means for producing first color signals, having positive spectral sensitivity components, and for producing second color signals corresponding in color to said first color signals but having negative spectral sensitivity components;

means for algebraically combining said first and said second color signals to produce composite color signals having both positive and negative spectral sensitivity components; and means for performing a color mixture operation using said composite color signals, thereby to realize color reproduction.

11. An apparatus according to claim 10, wherein said photodetector means comprises:

first photodetector means for producing first color signals having positive spectral sensitivity components; and second photodetector means for producing second color signals corresponding in color to said first color signals but having negative spectral sensitivity components.

\* \* \* \* \*